US008396483B2

(12) United States Patent
Chater-Lea et al.

(10) Patent No.: US 8,396,483 B2
(45) Date of Patent: Mar. 12, 2013

(54) MOBILE STATION, SYSTEM AND METHOD FOR USE IN WIRELESS COMMUNICATIONS

(75) Inventors: David J. Chater-Lea, Crowthorne (GB); Richard C. Lucas, Ash Vale (GB)

(73) Assignee: Motorola Solutions, Inc., Schaumburg, IL (US)

( * ) Notice: Subject to any disclaimer, the term of this patent is extended or adjusted under 35 U.S.C. 154(b) by 1033 days.

(21) Appl. No.: 12/158,728

(22) PCT Filed: Dec. 27, 2006

(86) PCT No.: PCT/US2006/049349
§ 371 (c)(1),
(2), (4) Date: Jun. 23, 2008

(87) PCT Pub. No.: WO2007/079109
PCT Pub. Date: Jul. 12, 2007

(65) Prior Publication Data
US 2009/0253438 A1  Oct. 8, 2009

(30) Foreign Application Priority Data

Dec. 29, 2005  (GB) .................................. 0526485.8

(51) Int. Cl.
*H04W 24/00* (2009.01)
(52) U.S. Cl. ........ 455/456.1; 455/19; 455/25; 455/13.3; 455/63.4; 455/456.2; 342/368
(58) Field of Classification Search .............. 455/456.1, 455/562.1, 12.1, 575.1, 575.5, 63.4, 25, 19, 455/13.3; 342/368, 354, 147, 154
See application file for complete search history.

(56) References Cited

U.S. PATENT DOCUMENTS

| 4,542,326 | A | | 9/1985 | Hornback |
| 5,570,369 | A | * | 10/1996 | Jokinen .................... 370/311 |
| 5,784,695 | A | * | 7/1998 | Upton et al. ............... 455/442 |
| 6,026,304 | A | | 2/2000 | Hilsenrath |
| 6,512,481 | B1 | | 1/2003 | Velazquez |
| 6,593,880 | B2 | | 7/2003 | Velazquez et al. |
| 6,640,085 | B1 | | 10/2003 | Chatzipetros |
| 6,795,710 | B1 | | 9/2004 | Creemer |
| 6,813,508 | B1 | | 11/2004 | Shioda |

(Continued)

FOREIGN PATENT DOCUMENTS

| GB | 2375267 A | 6/2002 |
| WO | WO02091776 A1 | 11/2002 |

OTHER PUBLICATIONS

EPC Search Report Dated Apr. 26, 2010.

(Continued)

*Primary Examiner* — Kamran Afshar
*Assistant Examiner* — Khalid Shaheed
(74) *Attorney, Agent, or Firm* — Terri Hughes Smith; Daniel R. Bestor

(57) ABSTRACT

A mobile station (101) for use in a wireless communication system includes a steerable antenna, means for obtaining location information relating to a current location of the mobile station and a steering controller for controlling a pointing direction of the steerable antenna using the location information and characterized in that the mobile station includes a memory holding a database of optimal pointing directions of the steerable antenna for given locations and the steering controller is operable to steer the antenna to the optimal pointing direction indicated in the database for the current location. Also described is a system and a method in which the mobile station operates.

18 Claims, 3 Drawing Sheets

U.S. PATENT DOCUMENTS

| | | | |
|---|---|---|---|
| 6,989,797 B2 * | 1/2006 | Gothard et al. | 343/834 |
| 2004/0104839 A1 | 6/2004 | Velazquez | |
| 2004/0266343 A1 * | 12/2004 | Fenk et al. | 455/12.1 |
| 2005/0277443 A1 * | 12/2005 | Ozluturk | 455/562.1 |
| 2007/0057843 A1 * | 3/2007 | Chang et al. | 342/368 |

OTHER PUBLICATIONS

PCT Search Report Dated Oct. 11, 2007.
EPC Communication Dated Jul. 9, 2010 for Counterpart Application.
Chinese Office Action Dated Mar. 8, 2011 for Counterpart Application.
EPC Communication Dated Mar. 11, 2011 for Counterpart Application.
Chinese Office Action Dated Nov. 21, 2011 for Counterpart Application.
English translation of Office Action for counterpart Chinese Patent Application No. CN200680050166 issued on Feb. 17, 2012.
International Preliminary Report on Patentability for counterpart International Application No. PCT/US2006/049349 mailed on Jul. 10, 2008.

\* cited by examiner

MOBILE STATION, SYSTEM AND METHOD FOR USE IN WIRELESS COMMUNICATIONS

CROSS REFERENCE TO RELATED APPLICATIONS

This application is a National Stage filing under 35 USC §371 of co-pending Patent Cooperation Treaty international application having Serial No. PCT/US2006/49349 (the "PCT international application") filed on Dec. 27, 2006. This application claims priority to the PCT international application and to prior Great Britain (GB) national application having Serial No. 0526485.8 filed on Dec. 29, 2005, the priority of which was also claimed in the PCT international application. Both the PCT international application and the GB national application are assigned to Motorola, Inc.

FIELD OF THE INVENTION

The present invention relates to a mobile station, a system and a method for use in wireless communications. In particular, the invention relates to use of a steerable antenna in a mobile station to provide a wireless communication link with a target terminal of the system.

BACKGROUND OF THE INVENTION

In a mobile communications system mobile or portable user terminals, such as mobile telephones or portable radios, herein collectively referred to as 'mobile stations' or 'MSs', can communicate via a network infrastructure which generally includes various fixed installations such as base stations (base transceiver stations) or 'BSs'. Each BS has one or more transceivers which serve MSs in a given region or area, known as a 'cell' or 'site', by radio communication. The cells of neighbouring BSs are often overlapping. Signals sent from MSs to their serving BS are known as 'uplink' signals. Signals sent from a BS to MSs are known as 'downlink' signals. Uplink and downlink signals may be sent on different channels, e.g. with different carrier frequencies.

A region or a zone served by an infrastructure including a number of BSs in this way can be considered to be a three dimensional space. At any point in this three dimensional space, a mobile station can be provided with service from one or more of the BSs.

It is desirable to maintain good link reliability between each MS and one of the BSs. It is well known for a MS to monitor signals from various BSs including its current serving BS to determine which BS can provide the best link. Such a procedure is known as 'cell selection' or 'cell re-selection'. Where the MS determines that it should be served by a BS other than its current serving BS it undergoes a procedure known as 'handover' or 'handoff' to form a service link with the other BS.

It is known for a MS to have a steerable antenna to help to improve the directionality and thereby the path loss of signals sent to and from a chosen BS, with the aim of improving signal strength and reducing interference received at both the BS and the MS.

Steerable antennas are known which employ information describing the known fixed location of the BS and the current location of the MS to calculate the direction of the BS from the MS and thereby to steer the antenna to point in that direction. However, information describing the locations of the BS and the MS alone does not provide an optimum steering direction in a multipath environment. This is because, in such an environment, signals arrive (at the MS or at the BS) at different angles owing to the combined effects of reflection and refraction of the transmitted radiation in addition to direct transmission. The errors so generated will lead to loss of pointing accuracy of the steerable antenna. A searching algorithm may be combined with a calculated pointing direction, but this must be continuously activated and adds a requirement for considerable computing complexity to the MS, which in turn will require increased processing power and therefore will lead to reduced battery life in portable equipment.

Related prior published patent specifications U.S. Pat. Nos. 6,512,481, 6,593,880 and US2004/0104839A, describe a system of obtaining location information by a GPS (Global Positioning System) receiver associated with the MS and computing an antenna pointing direction from the MS to the BS by use of the location information. The system described in these prior specifications does not account for the substantial errors obtained in multipath propagation as described above and would require either acceptance of such errors (and undesirably lower system gain) or addition of an adaptive algorithm with added computational complexity. The system also includes only a single link from the MS to the BS, and requires the MS to use omnidirectional antenna characteristics when changing cells during handover. This requires the computation procedure to start again on acquisition of a link from the MS to another serving BS having a different location. This will cause the MS and BS to have an increased vulnerability to interference and impaired link reliability during handover. The reduction of link reliability at this time may make the system unattractive where high reliability is needed, for example in railway applications where safety critical information may need to be exchanged over the radio link, or in ad hoc systems where the nature of the layout of equipment in the network is subject to change, or in cellular communications systems where multiple cells are required to serve to maintain link reliability over time.

SUMMARY OF THE INVENTION

According to the present invention in a first aspect there is provided a mobile station for use in a wireless communication system, the mobile station being as defined in claim 1 of the accompanying claims.

According to the present invention in a second aspect there is provided a wireless communication system, the system being as defined in claim 13 of the accompanying claims.

According to the present invention in a third aspect there is provided a method of operation in a wireless communication system, the method being as defined in claim 19 of the accompanying claims.

Further features of the invention are as defined in the accompanying dependent claims and in the embodiments of the invention to be described.

By the invention, a mobile station includes a steerable antenna, means for obtaining location information relating to a current location of the mobile station and a steering controller for controlling a pointing direction of the steerable antenna using the location information. The means for obtaining location information may comprise a GPS (Global Positioning System) receiver or another known location detector. The mobile station further includes a memory holding a database of optimal pointing directions for given locations of the mobile station; and the steering controller is operable to steer the antenna to the optimal pointing direction indicated in the database for the current location. The data stored in the database, or updates to that data, may conveniently be sent over the air to the mobile station from a database of the system, e.g.

held in a serving base station of the mobile station. The data may be broadcast to all mobile stations in a particular area.

The system database may be compiled using information about optimal antenna pointing directions obtained in use from mobile stations. Use of the optimal antenna pointing directions obtained from the database of the mobile station will beneficially reduce or eliminate the errors of the prior art caused in a multipath environment referred to earlier without employing unduly complex signal processing and will thereby provide better communication links without increasing consumed power in a mobile station.

Embodiments of the present invention will now be described by way of example with reference to the accompanying drawings, in which:

DESCRIPTION OF EMBODIMENTS OF THE INVENTION

Figure 1:
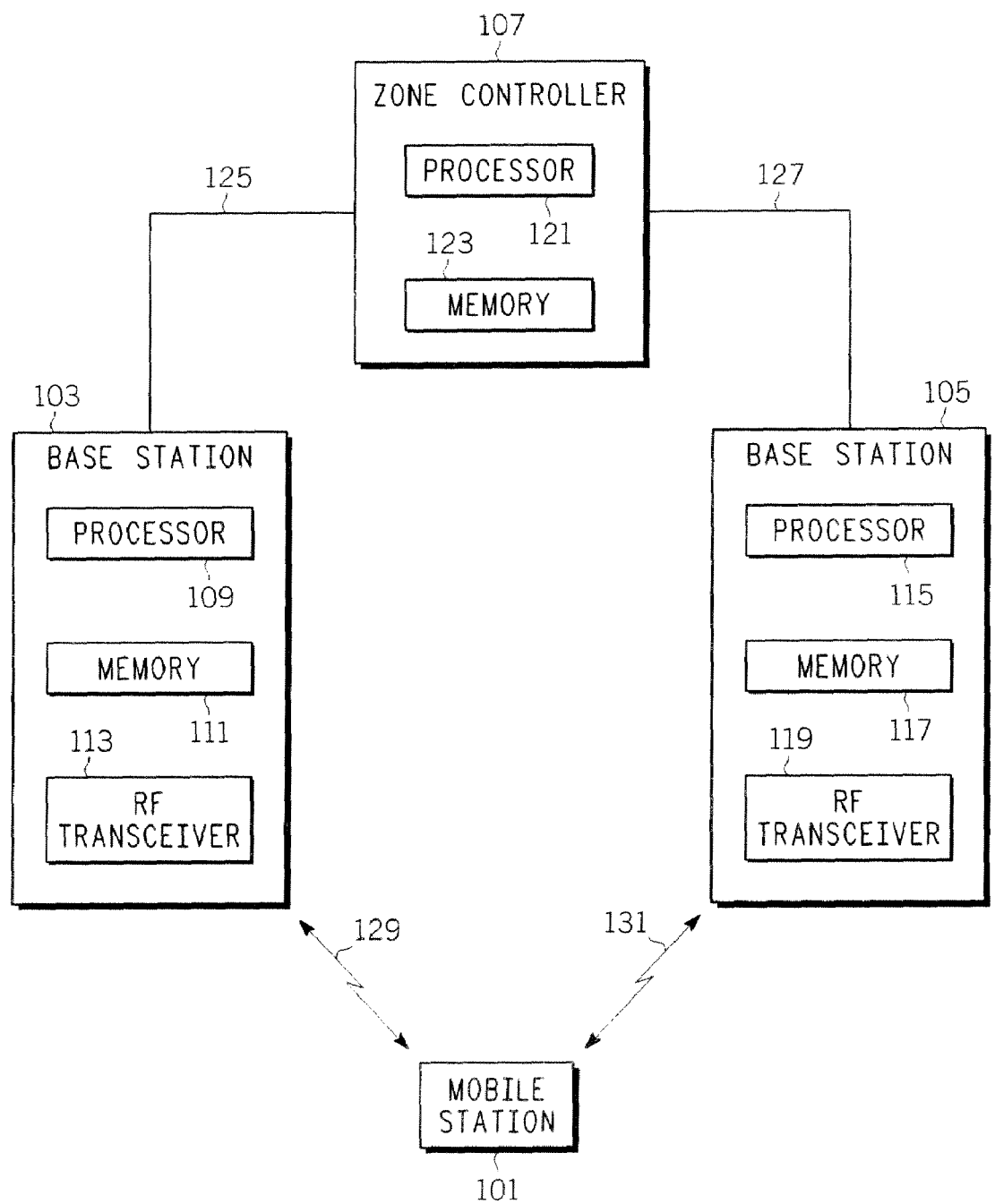
FIG. 1 is a block schematic diagram showing some components of a mobile communication system adapted to operate in accordance with an embodiment of the present invention.

FIG. 1 is a block schematic diagram showing some components of a mobile communication system 100 adapted to operate in accordance with an embodiment of the present invention. The system 100 may for example be a TETRA system, i.e. may employ operating procedures which are in accordance with the TETRA standard as defined by ETSI (European Telecommunications Standards Institute), although the invention is not limited to application in TETRA systems. Alternative systems in which the invention may be used are disclosed later. The system 100 includes a plurality of mobile stations, MSs, one of which is shown, as indicated by reference numeral 101, and is to be described in more detail later with reference to FIG. 2. The system 100 also includes a plurality of base stations, BSs, two of which, as indicated by reference numerals 103 and 105 respectively, are shown in FIG. 1. The BS 103 includes a processor 109, a memory 111 and a RF transceiver 113. The BS 105 includes a processor 115, a memory 117 and a RF transceiver 119. In practice, each of the BSs 103 and 105 may include a plurality of RF transceivers although only one is shown for simplicity in each of the BS 103 and 105. The BSs, including the BSs 103 and 105, define a set of overlapping service regions or cells in each of which MSs are served by the BS defining the region or cell, i.e. at the centre of the region or cell. The processor 109 of the BS 103 provides control, authentication, encryption, routing and other known operational functions of the BS 103. The processor 109 operates in conjunction with the memory 111 which stores data and programs needed in operation by the processor 109. The processor 115 and the memory 117 of the BS 105 provide respectively functions similar to those of the processor 109 and the memory 111.

The BSs 103 and 105 have respectively broadband links 125 and 127 to a zone controller 107 which includes a processor 121 and a memory 123. The zone controller 107 provides by the processor 121 operational control of the BSs in a given zone which is a given set of the overlapping regions or cells as well as links between BSs. The memory 123 of the zone controller 107 may for example store a database of details relating to the current location of mobile stations operating in the system 100 as well as data and programs needed in operation by the processor 121.

The BS 103 provides RF communication services to mobile stations currently in a service region or cell within a given distance from the fixed location of the BS 103 at the centre of the service region or cell. In other words, RF communications to and from each MS served by the BS 103 pass through the BS 103. Similarly, the BS 105 provides RF communication services to MSs currently in a service region or cell within a given distance from the fixed location of the BS 105 at the centre of the service region or cell. Currently, the MS 101 is being served by the BS 103 via a RF link 129. In practice, the RF link 129 may comprise (for RF signals from the MS 101 to the BS 103) an uplink and (for RF signals from the BS 103 to the MS 101) a downlink, wherein the uplink and the downlink are different, e.g. at different frequencies. The MS 101 can also receive signals from other BSs, such as the BS 105 via a link 131, so that when the MS 101 moves to a peripheral part of its current service region or cell it can operate a cell re-selection procedure in a known manner to determine whether it needs to undergo handover of service to the cell defined by another BS, such as the BS 105.

Figure 2:
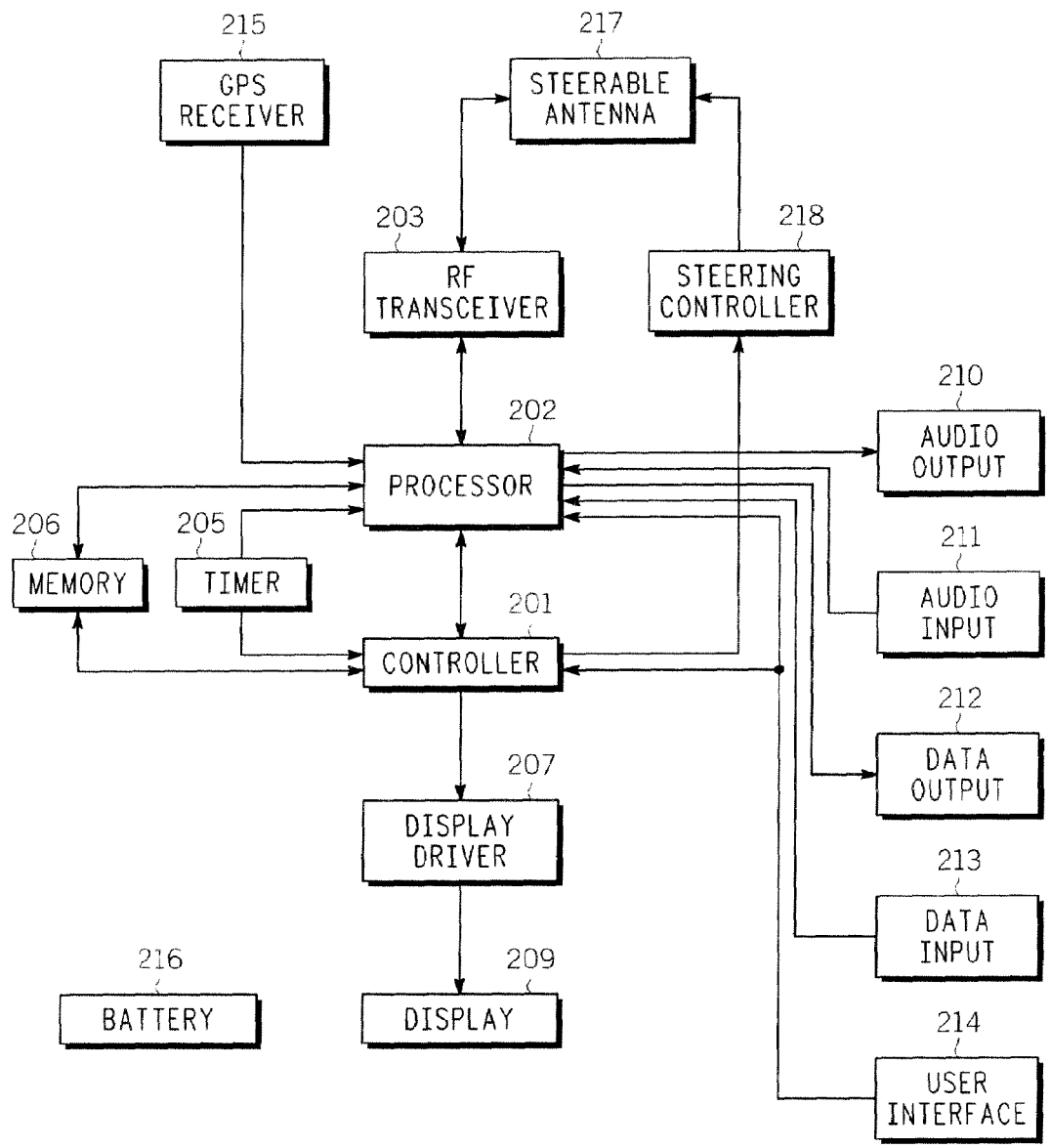
FIG. 2 is a block schematic diagram showing functional components of a mobile station of the system of FIG. 1.

FIG. 2 is a block schematic diagram showing functional components of the MS (mobile station) 101. A controller 201 controls functional operations of the MS 101. A processor 202 operably connected to the controller 201 processes information sent to and from the MS 101. The controller 201 and the processor 202 are operably connected to a timer 205 which provides operational synchronisation and timing and to a memory 206 which stores data and programs needed in operation by the controller 201 and the processor 202.

The processor 202 is operably connected to a RF transceiver 203 which transmits and receives RF signals including signals carrying information sent from and to the MS 101. The signals are delivered over the air to and from a steerable antenna 217 connected to the RF transceiver 203. The steerable antenna 217 is steered by a steering controller 218. The steerable antenna 217 may be a known component. Its steering may be operated electrically or electromechanically in a known manner. The steering controller 218, which is operably connected to the controller 201, steers the antenna 217, in a manner described later, so that it faces a selected orientational direction.

When the RF transceiver 203 via the antenna 217 receives a RF signal including information representing communicated speech, the processor 202 extracts the information and delivers a signal including the extracted information to an audio output 210 which comprises a transducer such as a speaker which converts the signal to audio form to reconstruct the communicated speech for a user of the mobile station 101. The MS 101 also includes an audio input 211 which comprises a transducer such as a microphone which converts speech of the user into the form of an electrical signal and delivers the signal to the processor 202 which processes the signal into a form suitable for inclusion in a RF signal for transmission by the transceiver 203 via the antenna 217.

When the RF transceiver 203 receives via the antenna 217 a signal representing communicated (non-speech) data, e.g. alphanumeric characters representing words or numerals or picture or video information, the processor 202 extracts information relating to the communicated data and delivers a signal including the extracted data to a data output 212. The data output may for example comprise a connection to an external data processing terminal (not shown), e.g. a personal computer.

A data input 213 provides an input signal from a user including data to be communicated. The data input 213 may for example comprise a connection to a data source, e.g. a personal computer (not shown). The signal provided by the data input 213 is delivered to the processor 202 which processes information included in the signal into a form suitable for inclusion in a RF signal to be transmitted by the RF transceiver 203 via the steerable antenna 217.

The MS 101 includes a user interface 214, e.g. a keypad and control buttons, which allows a user to enter instructions and data into the MS 101. The user interface 214 is operably connected to the controller 201 to receive signals representing instructions entered by a user at the user interface 214. The user interface 214 is also operably connected to the controller 201 to enable a signal representing data entered by the user at the user interface 214 to be delivered to the processor 202. The processor 202 processes data included in the signal into a form suitable for inclusion in a RF signal to be transmitted by the RF transceiver 203 via the antenna 217.

The mobile station 101 includes a known GPS (Global Positioning System) receiver 215 which receives signals from GPS satellites and computes the current location of the MS 101 from such signals in a known manner. The GPS receiver 215 is operably coupled to the processor 202 and delivers current location information obtained by the receiver 215 to the processor 202 for storage in the memory 206.

The MS 101 includes an electro-optical display 209 operable to display information to a user in a known manner. The display 209 is driven by a display driver 207 under control of the controller 201.

The MS 101 includes a battery 216 which provides a source of electrical energy for all active components of the MS 101.

The memory 206 of the MS 101 includes at least a part which is a non-volatile memory and which stores a database of optimum antenna pointing directions for the antenna 217 for each of the possible locations of the MS 101. The database effectively comprises a lookup table. Thus, when the current location of the MS 101 obtained from the GPS receiver 215 is recorded by the processor 202 in the memory 206, the controller 201 retrieves from the database of the memory 206 a corresponding optimum antenna pointing direction for that location. The controller delivers a control signal to the steering controller 218 which in response steers the antenna 217 in a known manner (electronically or mechanically) to point in the retrieved optimum direction.

In a simple form, the database of antenna pointing directions stored by the memory 206 may include only a single antenna pointing direction for each given location based on the assumption that the pointing direction is for a single link with a serving BS. Alternatively, the database may give pointing directions for links with each of a plurality of BSs including the current serving BS. In this case, the controller 201 selects the appropriate direction from the database according to which BS is being selected for a communication link. The BS selected will be the current serving BS, e.g. the BS 103 in the case of the MS 101, for delivery of traffic and control signals between the MS and BS. The BSs selected will also include other BSs, including the BS 105, for links to assist in a known cell re-selection procedure. In such a procedure, the MS 101 monitors the strength or quality of signals from different BSs including the current serving BS and applies an algorithm to determine whether it would be worthwhile to switch or undergo 'handover' or 'handoff' from the current serving BS to another one in a known manner.

In the database of antenna pointing directions stored in the memory 206 the 'location' for which each different pointing direction is stored may be a unit of area within the cell in which the MS 101 is operating. For example, the cell may be notionally divided in the form of a grid of the units of area and an optimal pointing direction may be assigned for each unit of area of the grid. The size of the unit of area chosen by a designer of the database may depend on a number of factors such as the size of the served cell, the number of mobile stations operating in the cell and the environmental and geographical features of the cell, e.g. whether it is in a built up area of a city or in a rural area.

In a more detailed example of the database of antenna pointing directions, the 'location' for which each different pointing direction is stored may be a notional unit of volume of a three dimensional space which comprises the cell in which the MS 101 is operating. It may be important for elevation to be included as a location defining parameter in this way as well as surface co-ordinates, e.g. latitude and longitude, where the system 100 provides communications in an environment in which there are significant elevation variations, e.g. in mountainous country or in a city where there are tall buildings.

The database of antenna pointing directions stored in the memory 206 may be compiled by the MS 101 using previously learned data. The database preferably comprises data sent to the MS 101 over the air (i.e. by wireless communication) by an infrastructure component of the system 100. Such communication may be by broadcast communication on a system control channel of the system 100. The infrastructure component sending the data may be the BS 103 currently serving the MS 101 or may be another fixed terminal operating in the system 100, e.g. a specially designated positioning transmitter (not shown). The data sent to the MS 101 in this way may for example comprise updates to data already held in a database by the MS 101 in its memory 206. The already held data may itself have been obtained by over the air communication or may have been obtained by connection of the MS 101 to a data source, e.g. a server containing the data, by a fixed line connection, e.g. via the data input 213.

The system 100 may itself include a memory which stores a database of optimal antenna pointing directions for mobile stations. For example, the memory 111 of the BS 103 may hold such a database. The memory 117 of the BS 105 may also hold such a database. The database held by the memory 111 may be different from that held by the memory 117 or it may be the same in each case. Where multiple memories of the infrastructure, e.g. in each of the BSs, hold the same database, the database may for example be distributed by the zone controller 107. The memory 123 of the zone controller may hold a master copy of the database.

Figure 3:
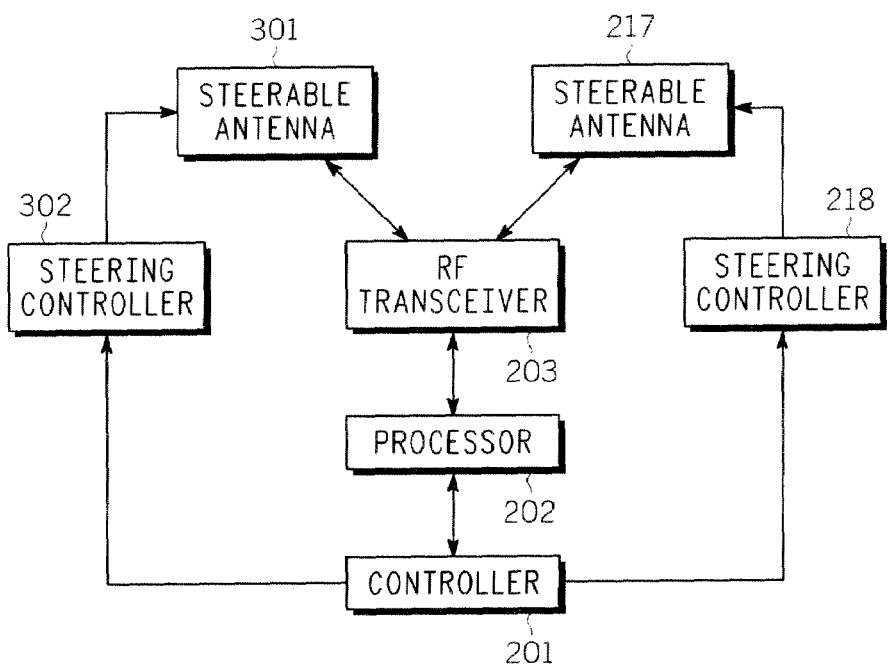
FIG. 3 is a block schematic diagram showing functional components of a modified form of the mobile station of the system of FIG. 1.

Although the mobile station embodying the invention has been described as including a single steerable antenna, the steerable antenna 217 of the MS 101, the mobile station could in a modified embodiment of the invention include multiple steerable antennas which may in practice be physically separate units or different operations of a single unit. This is illustrated in a modified form 300 of the MS 101 shown in FIG. 3 in which components having the same reference numerals as in FIG. 2 have the same function as such components. The form 300 also includes all of the other components of the MS 101 shown in FIG. 2. These are omitted for simplicity in FIG. 3. In FIG. 3, the form 300 includes a second steerable antenna 301 and a second steering controller 302 operably connected to the steerable antenna 301 to control a pointing direction of the steerable antenna 301. The steering controller 302 is operably connected to and controlled by the controller 201 in the same manner as the steering controller 218. RF signals may be sent and received by the RF transceiver 203 via either the steerable antenna 217 or the steerable antenna 301 as appropriate, e.g. depending on the signal type, e.g. signal frequency to be transmitted or received. Each of the steerable antennas 217 and 301 may be independently pointed at a target terminal (e.g. one of the BSs 103, 105) as appropriate in the same manner as described for the antenna 217 alone as described earlier.

Figure 4:
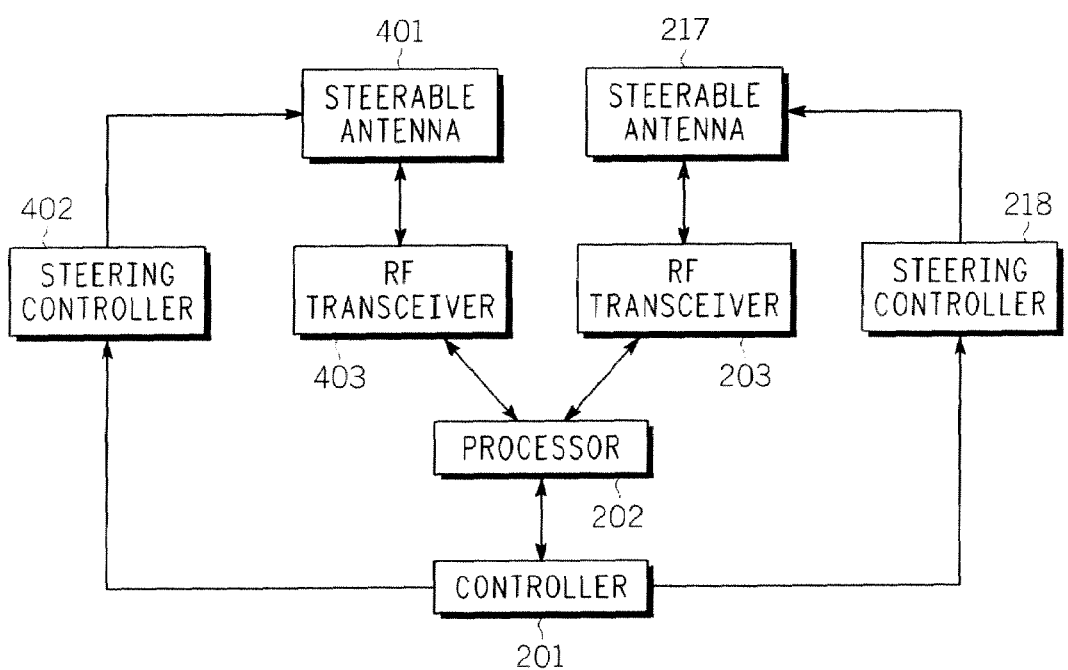
FIG. 4 is a block schematic diagram showing functional components of a further modified form of the mobile station of the system of FIG. 1.

Furthermore, although the mobile station embodying the invention has been described as including a single transceiver for RF communication, i.e. the transceiver 203 of the MS 101, the mobile station embodying the invention may include multiple RF transceivers and each of the transceivers may use one or more antennas, at least one of which is steerable. This is illustrated in a further modified form 400 of the MS 101 shown in FIG. 4 in which components having the same reference numerals as in FIG. 2 have the same function as such components. The form 400 also includes all of the other components of the MS 101 shown in FIG. 2. These are omitted for simplicity in FIG. 4. In FIG. 4, the form 400 includes a second steerable antenna 401 and a second steering controller 402 operably connected to the steerable antenna 401 to control a pointing direction of the steerable antenna 401. The steering controller 402 is operably connected to and controlled by the controller 201 in the same manner as the steering controller 218. The form 400 includes a further RF transceiver 403 in addition to the transceiver 203. RF signals may be sent and received either by the RF transceiver 203 via the steerable antenna 217 or by the RF transceiver 403 via the steerable antenna 401 as appropriate. For example, the RF transceivers 203 and 403 may be used in a manner as described in Applicant's copending UK Patent Application No. GB 0428465.9 which includes two or more transceivers working together and moving together, e.g. on a vehicle such as a railway train. One of the transceivers 203, 403 can for example take part in a communication of user information, e.g. speech or data, whilst the other is undergoing a known cell re-selection and/or a handover procedure. Each of the steerable antennas 217 and 401 may be independently pointed at a target terminal, e.g. a target BS, as appropriate in the same manner as described for the antenna 217 alone as described earlier.

Where the MS 101 of the system 100 described with reference to FIGS. 1 and 2 receives information for storage in the database of its memory 206 relating to optimal antenna pointing directions for selected locations and the information is sent to the MS 101 by broadcast communication from an infrastructure transmitter of the system 100, e.g. the serving BS 103, the broadcast communication may include related information useful to the MS 101. For example, the related information may give an indication of which BS will offer the best service to the MS 101 at a particular location and/or may indicate an expected value of signal strength or quality at the particular location. The MS may compare a signal strength or quality actually obtained at a particular location with an expected value of signal strength or quality at the location as indicated in a broadcast signal. Where the signal strength or quality measured is not as good as the value expected, the steerable antenna 217 may be adjusted to point in a direction, other than that indicated in the database, which gives a signal strength or quality better than that obtained. Where such an adjustment is made, information about the adjustment may be provided by the MS 101 to the system 100 via the serving BS 103 so that the appropriate database held in the system 100, e.g. in the memory 111 of the BS 103, may be updated with the corrected data relating to the improved pointing direction for the particular location. The corrected data may then be broadcast as a database update to other MSs so that the database held in their memory may be suitably updated.

In this way, the (or each) database of optimal antenna pointing directions held in system 100 can be updated by learning from MSs, thus continually optimising operation of the system 100. Optimised operation using pre-determined antenna pointing direction in the MS 101 as derived from the database of optimal antenna pointing directions stored in the memory 206 reduces the need for and complexity of computations in the MS 101, thereby beneficially reducing consumption of energy from the battery 216.

Each of the MSs operating in the system 100 may derive more accurate antenna pointing information using the database stored in its memory (e.g. the memory 206 for the MS 101) in the manner which has been described than by simple calculation of direction between MS and BS as proposed in the prior art.

Since the MS 101 may know in advance the optimal antenna pointing direction for the steerable antenna 217 to point at the BSs of neighbour cells, such as the BS 105, signal interference may be reduced, thereby minimising path loss and minimising cell acquisition time in cell re-selection and handover procedures, thereby further beneficially saving energy consumed from the battery 216.

Where the MS 101 includes multiple transceivers each with its own steerable antenna, as in the form 400 of FIG. 4, it may maintain links to multiple cells at the same time, using one transceiver and antenna to maintain a link and update its received broadcast database information whilst another transceiver is using this information to establish a link to an alternative cell. Such a procedure per se is described in Applicant's GB 0428465.9 referred to earlier.

In another embodiment of the invention, the system 100 may comprise an ad hoc network, in which base stations such as the BS 103 and the BS 105, are commissioned and decommissioned as required; alternatively MSs may form part of the communication chain. In this case, database information relating to optimal antenna pointing directions can be continually or frequently provided to BSs and/or MSs added to the system 100 thereby improving link paths and reducing interference in the manner described above, thereby beneficially increasing traffic capacity of the system 100.

In another embodiment, the system 100 may be a local area network, e.g. used in an office environment, e.g. providing wireless connection of computer equipment, wherein mobile components of the equipment possess directional antennas which are steerable. The changing nature of the environment can be captured in the recorded database of optimal antenna pointing directions of the mobile components and the information relating to the database may be broadcast in the manner described above, thereby optimising acquisition and capacity of the network.

Thus, the invention may find use in ad hoc networks and in local area networks such as office networks as well as in cellular radio networks and in safety critical networks, e.g. for communications in railway and other transport systems. Where the invention is applied in a cellular radio network, the network may for example be one which is a TETRA network, i.e. a network which operates in accordance with the TETRA industry standard as referred to earlier, or an APCO network, i.e. a network which operates in accordance with the APCO 25 industry standard, or a mobile communication network which operates in accordance with another industry standard such as the GSM standard.

What is claimed is:

1. A mobile station for use in a wireless communication system comprising:
a steerable antenna;
means for obtaining location information relating to a current location of the mobile station;
a memory comprising a local database of optimal antenna pointing directions for given locations;
a steering controller configured to control a pointing direction of the steerable antenna using the location information and the optimal pointing direction indicated in the local database for the current location of the mobile station;
a receiver configured to receive, by wireless communication, one or more received updates to the local database, each received update indicating a difference, for each particular given location in the received update, between a first antenna pointing direction stored in the local database and a received improved antenna pointing direction that is associated with an improved signal strength or quality;
a detector configured to detect an improved optimal antenna pointing direction detected to give an improved signal strength or quality compared to a corresponding optimal pointing directions indicated in the local database for the current location of the mobile station; and
a transmitter configured to send, by wireless communication, a signal providing the detected improved optimal antenna pointing direction to a remote terminal of the system for storage in a remote database of the system, wherein the transmitted signal provides information indicating a difference, for the current location in the detected improvements, between a particular optimal antenna pointing direction stored in the local database and the detected improved optimal antenna pointing direction.

2. The mobile station according to claim 1, wherein the optimal pointing direction for the current location of the mobile station provides a link to a base station of the system currently serving the mobile station.

3. The mobile station according to claim 1, wherein the optimal pointing direction for the current location of the mobile station provides receipt of a signal from a base station other than a base station of the system currently serving the mobile station.

4. The mobile station according to claim 1, further comprising a global positioning system (GPS) receiver operable to derive the location information.

5. The mobile station according to claim 1, further comprising a processor operable to compute the current location of the mobile station using signals from one or more terminals of the system.

6. The mobile station according to claim 1, wherein the receiver is further configured to receive, by wireless communication, from the mobile station's current serving base station or from another terminal of the system, a preferred base station signal giving, for a particular location of the mobile station, a preferred base station to provide service to the mobile station at that location.

7. The mobile station according claim 1,
wherein the receiver is further configured to receive, from its current serving base station or from another terminal of the system, an expected signal strength signal giving, for a particular location of the mobile station, an expected signal strength or quality from the current serving base station or another terminal of the system;
the mobile station further comprising:
means for measuring a received signal strength or quality; and
a comparator for comparing the received signal strength or quality with the expected signal strength or quality.

8. The mobile station according to claim 7, wherein the steering controller is further operable to adjust the pointing direction of the steerable antenna when a difference between an expected signal strength or quality and a received signal strength or quality is found.

9. The mobile station according to claim 1, further comprising a plurality of independently steerable antennas.

10. The mobile station according to claim 9, further comprising a plurality of radio frequency transceivers, each operably coupled to one of the steerable antennas.

11. A wireless communication system comprising:
a base station; and
one or more mobile stations each comprising a steerable antenna,
wherein the base station is operably connected to a memory comprising a local database of information relating to optimal pointing directions to be used by each of the mobile stations to point the steerable antenna of the mobile station toward a target terminal, and wherein the base station is operable to:
(i) send to the one or more mobile stations signals comprising transmitted updates to the information stored in the memory for use by the mobile stations in updating locally maintained copies of the information at the mobile stations, each received update indicating a difference, for each particular given location in the transmitted update, between a first antenna pointing direction in the information stored in the memory and a transmitted improved antenna pointing direction that is associated with an improved signal strength or quality; and
(ii) receive from the one or more mobile stations a signal comprising received updates providing information indicating a difference for a given location between a first antenna pointing direction stored in the local database and an improved antenna pointing direction detected, by the one or more mobile stations, to give an improved signal strength or quality and to update corresponding data stored in the local database with the improved antenna pointing direction.

12. The system according to claim 11, wherein the memory is included within the base station.

13. The system according to claim 11, wherein the target terminal is the base station.

14. The system according to claim 11, further comprising a plurality of base stations, and wherein the information stored in the memory and sent to the one or more mobile stations relates to optimal pointing directions to be used by the one or more mobile stations when in a particular location to point the steerable antenna of the one or more mobile stations toward each of the base stations.

15. The system according to claim 11, which comprises an ad hoc network, a local area network, a safety critical communication network or a cellular radio communication network.

16. The system according to claim 15, which comprises a TETRA or an APCO or a GSM communication network.

17. A method of operation in a wireless communication system comprising a base station, and one or more mobile stations each including a steerable antenna, the method comprising, at the base station:
  receiving information relating to optimal pointing directions for given locations to be used by the one or more mobile stations to point the steerable antenna of the one or more mobile stations toward a target terminal;
  storing the received information in a local database;
  sending, by wireless communication, the information to the one or more mobile stations;
  receiving, by wireless communication from at least one of the mobile stations, a signal comprising one or more received updates providing information indicating a difference for a given location between a first antenna pointing direction previously sent to the at least one mobile station and an improved antenna pointing direction detected, by the at least one mobile station, to give an improved signal strength or quality and to update corresponding data stored in the local database with the improved antenna pointing direction; and
  storing the received updates to the information in the local database.

18. The method according to claim 17, further comprising the step of broadcasting the received updates to the information to the one or more mobile stations.

* * * * *